United States Patent
Quadadakkers et al.

(10) Patent No.: US 6,936,217 B2
(45) Date of Patent: Aug. 30, 2005

(54) HIGH-TEMPERATURE MATERIAL

(75) Inventors: Willem Joseph Quadadakkers, EG Wijnandsrade (NL); Vladimir Shemet, Julich (DE); Lorenz Singheiser, Julich (DE)

(73) Assignee: Forschungszentrum Jülich GmbH, Jülich ( * ) Notice: Subject to any disclaimer, the term of this patent is extended or adjusted under 35 U.S.C. 154(b) by 355 days.

(21) Appl. No.: 10/298,293

(22) Filed: Nov. 18, 2002

(65) Prior Publication Data

US 2003/0059335 A1 Mar. 27, 2003

Related U.S. Application Data

(63) Continuation-in-part of application No. PCT/DE01/01415, filed on Apr. 6, 2001.

(30) Foreign Application Priority Data

May 20, 2000 (DE) .......................................... 100 25 108

(51) Int. Cl.[7] .......................... C22C 38/18; H01M 2/00; H01M 4/02; H01M 4/86
(52) U.S. Cl. .......................... 420/40; 148/325; 429/34; 429/40; 429/209; 313/118
(58) Field of Search .............................. 420/34, 60–63, 420/89, 90, 93, 103, 124, 125, 126, 127, 40, 67–70, 123–12; 148/325

(56) References Cited

U.S. PATENT DOCUMENTS 5,310,431 A * 5/1994 Buck .......................... 148/325
5,902,692 A    5/1999 Batawi
5,942,349 A * 8/1999 Badwal et al. ................. 429/34
6,086,689 A * 7/2000 Sassoulas et al. ............ 148/531
6,294,131 B1 * 9/2001 Jaffrey .......................... 420/40

FOREIGN PATENT DOCUMENTS

| DE | 42 27 603 | 5/1994 | |
| DE | 4227603 C * | 5/1994 | ............ H01M/4/36 |
| DE | 44 22 624 | 1/1996 | |
| DE | 195 46 614 | 6/1997 | |
| JP | 08 188853 | 7/1996 | |
| WO | WO 97/23006 | 6/1997 | |
| WO | WO 99/25890 | 5/1999 | |

* cited by examiner

*Primary Examiner*—Patrick Joseph Ryan
*Assistant Examiner*—Melissa Austin
(74) *Attorney, Agent, or Firm*—Klaus J. Bach

(57) ABSTRACT

A high temperature material which consists of a chromium oxide forming iron alloy including:

a) 12 to 28 wt % chromium,
b) 0.01 to 0.4 wt % La,
c) 0.2 to 1.0 wt % Mn,
d) 0.05 to 0.4 wt % Ti,
e) less than 0.2 wt % Si,
f) less than 0.2 wt % Al, wherein, at temperatures of 700° C. to 950° C., the high temperature material is capable of forming a Mn $Cr_2O_4$ spinel phase. At a temperature of 700° C. to 950° on Mn, $Cr_2O_4$ the spinel phase formed protects a body, such as spark plug electrodes and other electrodes.

10 Claims, No Drawings

HIGH-TEMPERATURE MATERIAL

This is a Continuation-In-Part application of international application PCT/DE01/01415 filed Apr. 6, 2001, and claiming the priority of German application 100 25 108.0 filed May 20, 2000.

BACKGROUND OF THE INVENTION

The application relates to a high temperature material particularly a high temperature material for a bi-polar plate of a high temperature fuel cell.

A high temperature fuel cell (Solid Oxide Fuel Cell—SOFC) allows direct conversion of chemical energy into electrical energy. The fuel ($H_2$, $CH_4$, CO, etc.) is separated from an oxidation medium ($O_2$, air) by an oxygen ion conducting solid electrolyte (γ-stabilized $ZrO_2$). At an operating temperature of the fuel cell of about 700° C. to 950° C. oxygen ions are transported from the cathode side through the electrolyte to the anode side where they react with the fuel. Because of a charge compensation, electrons flow through the electrolyte in the same direction.

The electrolyte is coated by porous catalytically active electrode materials. Generally, the anode (fuel side) consists of a Ni/$Zro_2$-cermet and the cathode (oxygen side) consists of a perovskite on the basis of La.

To utilize the SOFC technique for electric power generation, several cells must be connected. Therefore, another component is required that is the so-called bi-polar plate, which is sometimes also called interconnector. The bi-polar plate is utilized as a gas supplying connecting part between the individual cells, but also provides the mechanical support structure of the cell.

The bi-polar plate consists of an alloy that must have certain properties. An essential property is high oxidation resistance in the anode and cathode gases at the high operating temperatures of the fuel cell. Furthermore, because of the required physical compatibility with the ceramic components, it must have a low expansion coefficient (about $10 \times 10^{-6} K^{-1}$ to $12 \times 10^{-6} K^{-1}$). The optimal expansion coefficient depends on the particular cell concept. With anode substrate supported cells, generally somewhat higher expansion coefficients are required than with cells on the basis of an electrolyte foil concept.

Typical construction materials for the interconnector are ferritic chromium steels. The oxidation resistance of these materials is based on the formation of a protective oxide layer on the basis of $Cr_2O_3$, which is formed at high temperatures on the surface of the material. These oxide layers, however, do not behave in an optimum manner at the high operating temperatures. They may spall off from the alloy surface and may thus inhibit the gas flow in the gas channels of the bi-polar plate during long term operations. In addition, the thick $Cr_2O_3$ layers formed over extended periods of operation detrimentally affect the electric conductivity of the interconnector. Furthermore, with a high oxygen pressure as it exists generally at the cathode side, volatile chromium oxides and/or hydroxides are formed which poison the cathode/electrode interface and reduce the cell efficiency.

DE 195 47 699 A1 discloses a bi-polar plate of a chromium oxide forming alloy with a mixed oxide layer for increasing the conductivity and reducing the vaporization rate.

DE 44 2 624 A1 discloses a method for protecting chromium-containing bodies wherein the bodies are provided with a protective layer of an oxidic chromate.

A disadvantage of the coating procedure however is that the bipolar plates coated in this way are relatively expensive. In addition, the coating layers cannot be healed during operation of the cell and damages remain.

DE 195 46 614 C2 discloses a chromium oxide forming alloy for high temperature applications which is oxidation resistant for long periods. This alloy includes up to 1% of reactive element additives.

It is the object of the present invention to provide a high temperature material, which heals itself when subjected to mechanical damages at its surface. It is furthermore an object of the invention to provide a bi-polar plate for a high temperature fuel cell, which has the advantages mentioned above.

SUMMARY OF THE INVENTION

A high temperature material which consists of a chromium oxide forming iron alloy including:

a) 12 to 28 wt % chromium,
b) 0.01 to 0.4 wt % La,
c) 0.2 to 1.0 wt % Mn,
d) 0.05 to 0.4 wt % Ti,
e) less than 0.2 wt % Si,
f) less than 0.2 wt % Al, At a temperature of 700° C. to 950° C. a $MnCr_2O_4$ spinel phase is formed on the surface of components which are manufactured from such a material. Such components include for example spark plug electrodes and other electrodes.

The high temperature material according to the invention is a chromium oxide-forming iron-based alloy and is suitable for use at temperatures up to 950° C. It comprises one or more elements with a high oxygen affinity. An element with high oxygen affinity is to be understood as a chemical element, which has a higher affinity to oxygen than chromium. Such elements, which are frequently called reactive elements include particularly Y, Ce, Hf, Zr, and La. The total content of these elements with high oxygen affinity is preferably between 0.01 and 2 wt % particularly 0.1–0.4 wt %, if the elements are the pure elements.

The addition of these reactive elements generally increases the life of the high temperature material. Furthermore, they cause a slow-down of the transport of oxygen and metal ions through the $Cr_2O_3$ surface scale or they completely block this transport. If protective $Cr_2O_3$ surface layers are formed on the alloy or respectively, the high temperature material, the reactive elements diffuse into the cover layers. As a result of diffusion processes, the elements with high oxygen affinity are incorporated into the oxide grain boundaries and block the transport passages for the metal and oxygen ions. As a result, the further growth of the $Cr_2O_3$ scale is slowed down. The slower growth again results in an improved adhesion of the $Cr_2O_3$ surface layer on the alloy. Because of these two effects, the performance of the alloy, or respectively, a component consisting of this alloy, is substantially improved and the life thereof is substantially increased particularly during use at high temperatures.

The high temperature material according to the invention includes at least a second element M, which, at high temperatures as they for example prevail during the operation of a high temperature fuel cell, form at the interphase oxide/gas together with $Cr_2O_3$ a spinel phase of the type $MCr_2O_4$. This results in a substantial reduction in the evaporation rate of the chromium oxide and/or -hydroxide from the surface.

Suitable second elements for this purpose are Mn, Ni and Co. Particularly suitable is the alloy element Mn since it forms a spinel phase even if only small amounts are present in the alloy in comparison with the other elements mentioned. These second elements M are contained in the high temperature material in concentrations of up to 2 wt %, particularly in the concentration range of 0.2 to 1 wt %.

The high temperature material according to the invention furthermore includes a third element, which increases the electric conductivity of the chromium-based oxide scale. Elements suitable herefor are Zr, Hf, Sr, or Ca, and, particularly Ti. The high temperature material contains the first four elements in concentrations of up to 2 wt % particularly in a concentration range of 0.1 to 0.4 wt % and Ti in concentrations of 0.05 to 0.4 wt %.

At high temperatures as they prevail typically during operation of a high temperature fuel cell, the high temperature material according to the invention has particularly advantageous properties. It has for example a good oxidation resistance, good electric conductivity of the oxide layer described herein, a good adhesion of the oxide layer and a low chromium oxide, or respectively, chromium hydroxide evaporation rate. The high temperature material has the additional advantage that, upon mechanically induced stresses, which result in formation of a surface defect, the surface oxide layer is automatically healed.

In an advantageous composition of the high temperature material, the chromium is present in a concentration range of 12 to 28 wt % (such a material is commonly called a ferritic chromium steel). Particularly advantageous are chromium concentrations of between 17 and 25 wt %. The exact chromium content depends on the operating temperature at which the material is used: high operating temperatures require higher chromium concentrations. Furthermore, the chromium concentration depends on the desired expansion coefficient; increasing the chromium content reduces the thermal expansion coefficient.

In an advantageous composition of the high-temperature material according to the invention, the elements Si and Al are present only in concentrations of up to 0.5 wt %. The elements Si and Al tend to form oxides of their own which disturbs the formation of the chromium oxide. Their concentration should therefore be limited to the values given above. Preferably, the Si and/or Al concentrations are below 0.2 wt %.

It has been found to be advantageous to add the alloying additions with high oxygen affinity to the alloy not in the form of pure elements but in the form of an oxide dispersion (for example, $Y_2O_3$, $La_2O_3$). The concentrations based on the pure elements are then changed for the respective oxide dispersions to concentration ranges of 0.02 to 4% wt %, preferably 0.2 to 1 wt %.

In another variant, the high temperature material contains low concentrations of trace elements and impurities usually present in ferritic steel. Those include particularly C, N, S, B, P, V, and Cu. The concentrations of the elements V and Cu each are preferably smaller than 1 wt % and the total concentration of the remaining elements C, N, S, B, P, V and Cu is also less than 1 wt %.

Preferably, the high temperature material may include, depending on the required thermal expansion coefficient, the following additional elements: Mo, W, Ta, Nb and Re. These elements have a high melting point and, in general, lead to a reduction of the thermal expansion coefficient of the ferritic steel. The concentration of these elements is lower than 10 wt % and preferably smaller than 3 wt %.

In another advantageous variant of the high temperature material, additional alloying elements are included only to such an amount that, at the operating temperature, the alloy does not become austenitic. This can be achieved for example by keeping the Ni concentrations lower than 2 wt %, preferably below 1 wt %. The formation of an austenitic lattice structure would detrimentally affect the expansion coefficient of the material and should therefore be prevented.

The high temperature material according to the invention with its advantageous properties is particularly suitable for bi-polar plates of a high temperature fuel cell, SOFC. But it can also be used in other technical applications where a high oxidation/corrosion resistance in combination with a high electric conductivity of the oxide layer at high temperatures is required. This material is also advantageous when low evaporation rates of the surface oxide layer are needed. Examples of such applications are spark plugs and electrodes in liquid metals and melts.

What is claimed is:

1. A high temperature material comprising a chromium oxide forming an iron-based alloy containing:
   a) 12 to 28 wt % chromium,
   b) 0.01 to 0.4 wt % La,
   c) 0.2 to 1.0 wt % Mn,
   d) 0.05 to 0.4 wt % Ti,
   e) less than 0.2 wt % Si,
   f) less than 0.2 wt % Al,
   with the property that at temperatures of 700° C. to 950° C. said high temperature material is capable of forming at its surface a Mn $Cr_2O_4$ spinel phase.

2. A high temperature material according to claim 1, wherein said chromium oxide forming iron-based alloy additionally includes 0.1 to 0.4 wt % of an element or mixture of the group of elements consisting of Y and Ce.

3. A high temperature material according to claim 2, wherein said chromium oxide forming iron alloy includes additionally 0.1 to 0.4 wt % of an element or mixture of the group of elements consisting of Hf, Sr, Ca, Zr.

4. A high temperature material according to claim 1, wherein manganese is included in the chromium oxide forming iron alloy.

5. A high temperature material according to claim 1, wherein said chromium oxide forming iron alloy contains additionally up to 1 wt % of at least one element of the group consisting of C, N, S, B and P.

6. A high temperature material according to claim 1, wherein said chromium oxide forming iron alloys contains additionally up to 1 wt % of at least one of the elements vanadium and copper.

7. A high temperature material according to claim 1, wherein said chromium oxide forming iron alloys contains up to 1 wt % of at least one element of the group of Mo, W, Nb, Ta, and Re.

8. A bipolar plate consisting of a high temperature material comprising a chromium oxide forming iron alloy including:
   a) 12 to 28 wt % chromium,
   b) 0.01 to 0.4 wt % La,
   c) 0.2 to 1.0 wt % Mn,
   d) 0.05 to 0.4 wt % Ti,
   e) less than 0.2 wt % Si,
   f) less than 0.2 wt % Al,
   wherein, at temperatures of 700° C. to 950° C., said high temperature material is capable of forming a $MnCr_2O_4$ spinel phase.

9. A spark plug including electrodes consisting of a high temperature material comprising a chromium oxide forming iron alloy including:

a) 12 to 28 wt % chromium,
b) 0.01 to 0.4 wt % La,
c) 0.2 to 1.0 wt % Mn,
d) 0.05 to 0.4 wt % Ti,
e) less than 0.2 wt % Si,
f) less than 0.2 wt % Al, wherein, at temperatures of 700° C. to 950° C., said high temperature material is capable of forming a $MnCr_2O_4$ spinel phase.

10. An electrode consisting a high temperature material comprising a chromium oxide forming iron alloy including:

a) 12 to 28 wt % chromium,
b) 0.01 to 0.4 wt % La,
c) 0.2 to 1.0 wt % Mn,
d) 0.05 to 0.4 wt % Ti,
e) less than 0.2 wt % Si,
f) less than 0.2 wt % Al, wherein, at temperatures of 700° C. to 950° C. said high temperature material is capable of forming a $Mn\,Cr_2O_4$ spinel phase.

* * * * *